(12) United States Patent
Bledsoe et al.

(10) Patent No.: US 7,255,822 B2
(45) Date of Patent: Aug. 14, 2007

(54) PROCESS FOR MANUFACTURING A COMPOSITE SHEET

(75) Inventors: James G. Bledsoe, Goshen, IN (US); Donald C. Ray, Angola, IN (US); Mark E. Farver, Goshen, IN (US)

(73) Assignee: Owens-Corning Fiberglas Technology Inc., Summit, IL (US)

( * ) Notice: Subject to any disclaimer, the term of this patent is extended or adjusted under 35 U.S.C. 154(b) by 366 days.

(21) Appl. No.: 10/062,062

(22) Filed: Jan. 31, 2002

(65) Prior Publication Data

US 2003/0143373 A1    Jul. 31, 2003

(51) Int. Cl.
| | |
|---|---|
| B32B 37/00 | (2006.01) |
| B32B 38/04 | (2006.01) |
| B29C 69/00 | (2006.01) |
| B32B 9/00 | (2006.01) |
| B32B 33/00 | (2006.01) |
| B29C 65/00 | (2006.01) |

(52) U.S. Cl. ............ 264/261; 264/510; 264/511; 264/102; 264/571; 264/263; 264/154; 264/156; 264/258

(58) Field of Classification Search ........ 264/510–512, 264/102, 571, 261, 263, 154–156, 249, 257, 264/258, 293, 294, 324
See application file for complete search history.

(56) References Cited

U.S. PATENT DOCUMENTS

| | | | |
|---|---|---|---|
| 3,725,172 A | 4/1973 | Fekete et al. | |
| 4,042,746 A | 8/1977 | Hofer | |
| 4,082,882 A * | 4/1978 | Weinstein et al. | 428/246 |
| 4,196,242 A | 4/1980 | McLaren | |
| 4,568,597 A * | 2/1986 | Williams | 428/137 |
| 4,655,869 A * | 4/1987 | Tellman et al. | 156/252 |
| 5,054,645 A * | 10/1991 | Sharp | 220/445 |
| 5,320,151 A | 6/1994 | Wumer | |
| 5,362,545 A | 11/1994 | Tingley | |
| 5,446,250 A * | 8/1995 | Oka | 181/208 |
| 5,472,290 A | 12/1995 | Hulls | |
| 5,498,460 A | 3/1996 | Tingley | |
| 5,509,714 A | 4/1996 | Schmidt | |
| 5,736,220 A | 4/1998 | Tingley | |
| 6,062,351 A * | 5/2000 | Strasser et al. | 188/251 A |
| 6,106,205 A | 8/2000 | Haire | |

FOREIGN PATENT DOCUMENTS

| | | | |
|---|---|---|---|
| JP | 58-076216 | * | 5/1983 |
| JP | 62-064527 | * | 3/1987 |
| JP | 05-038768 | * | 2/1993 |

* cited by examiner

*Primary Examiner*—Christina Johnson
*Assistant Examiner*—Matthew J. Daniels
(74) *Attorney, Agent, or Firm*—Inger H. Eckert; Margaret S. Millikin

(57) ABSTRACT

A method of manufacturing a composite sheet includes perforating a reinforcement panel. A mold surface onto which the composite sheet may be formed is provided. At least one outer coat of material is applied onto the mold surface. At least one coat of resin and reinforcement material is applied over the outer coat to form a reinforcement layer. The perforated reinforcement panel is applied to the reinforcement layer, and the resin is forced into the perforations formed in the reinforcement panel, thereby bonding the reinforcement layer to the reinforcement panel.

9 Claims, 3 Drawing Sheets

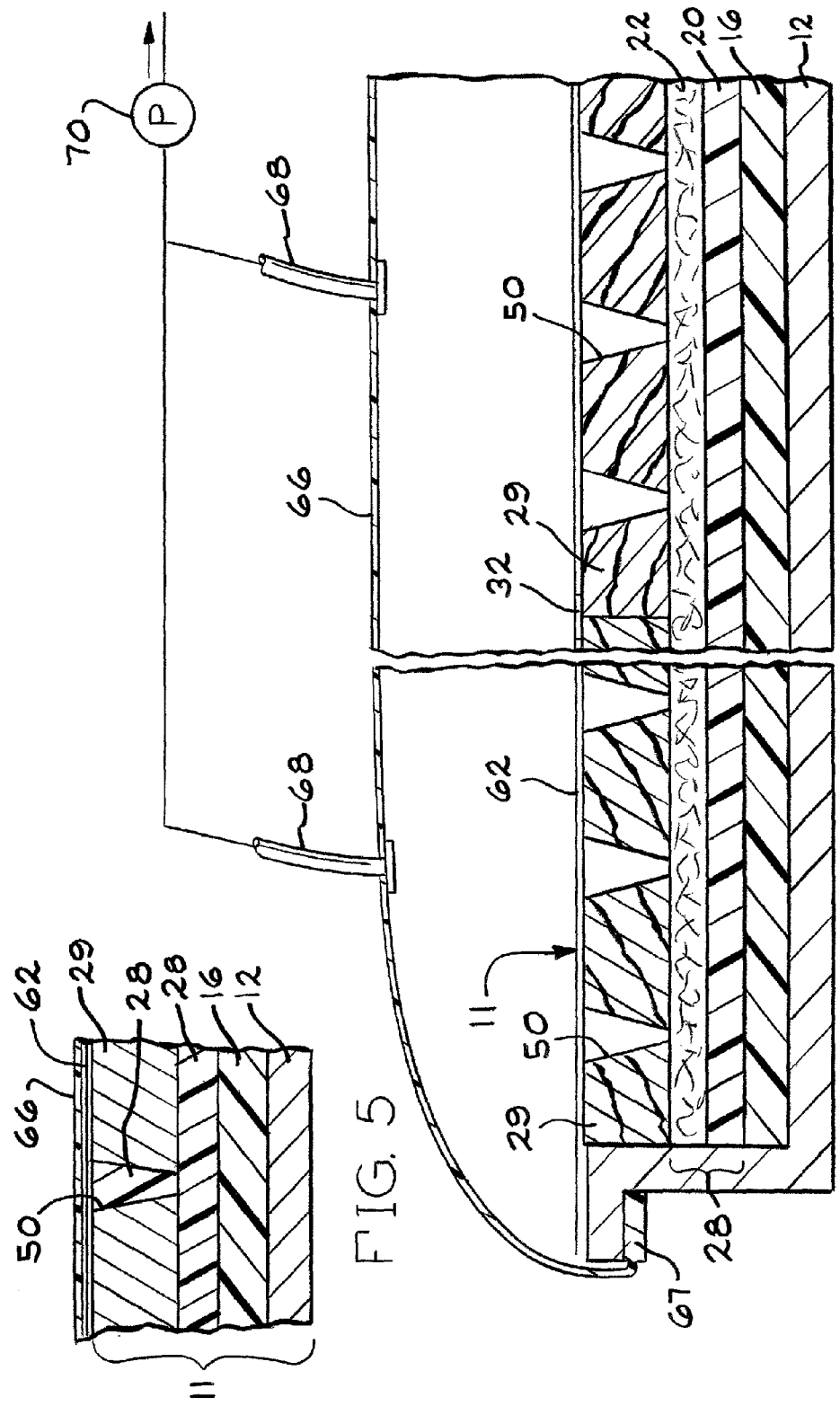

PROCESS FOR MANUFACTURING A COMPOSITE SHEET

TECHNICAL FIELD

This invention relates in general to a method and apparatus for the manufacture of fiber-reinforced panels, and in particular, to a method and apparatus for the manufacture of a composite sheet suitable for such uses as a recreational vehicle wall.

BACKGROUND OF THE INVENTION

It is commonplace in the recreational vehicle business to use composite sheets, such as glass fiber-reinforced wall panels, for the exterior surface of a recreational vehicle. These wall panels vary in widths up to, and including, dimensions from 2.4 to 3 meters (8 to 10 feet), and can have a length as long as 12 meters (40 ft.) or more. While the composite material from which the panels are made provides an adequate material for the recreational vehicle side walls, it would be advantageous to provide an improved composite sheet having a stronger bond between respective layers of the composite sheet.

SUMMARY OF THE INVENTION

The above objects as well as other objects not specifically enumerated are achieved by a method and apparatus for manufacturing a composite sheet according to the present invention. The method of manufacturing a composite sheet includes perforating a reinforcement panel. A mold surface onto which the composite sheet may be formed is provided. At least one outer coat of material is applied onto the mold surface. At least one coat of resin and reinforcement material is applied over the outer coat to form a reinforcement layer. The perforated reinforcement panel is applied to the reinforcement layer, and the resin is then forced into the perforations formed in the reinforcement panel, thereby bonding the reinforcement layer to the reinforcement panel.

In another embodiment of the invention, an apparatus for manufacturing a composite sheet includes a perforating mechanism to perforate reinforcement panels. A mold surface onto which the composite sheet may be formed is provided. The apparatus includes at least one dispensing mechanism to dispense at least one outer coat of material onto the mold surface, and at least one dispensing mechanism to dispense at least one coat of resin over the outer coat. At least one applicator mechanism is provided to apply reinforcement material over the outer coat, wherein the resin and the reinforcement material form a reinforcement layer. At least one mechanism is provided to force the resin into the perforations of the perforated reinforcement panel after the reinforcement panel has been applied to the reinforcement layer.

In another embodiment of the invention, a composite sheet includes a layer of outer coat material. A layer of resin and reinforcement material is applied to the outer coat layer, the layer of resin and reinforcement material forming a reinforcement layer. A perforated reinforcement panel is applied to the reinforcement layer, a portion of the reinforcement layer being forced into the perforations of the perforated reinforcement panel, thereby bonding the reinforcement layer to the reinforcement panel.

Various objects and advantages of this invention will become apparent to those skilled in the art from the following detailed description of the preferred embodiment, when read in light of the accompanying drawings.

BRIEF DESCRIPTION OF THE DRAWINGS

FIG. 4 is an enlarged cross sectional view in elevation of the composite sheet of FIG. 1 showing a vacuum bag attached to the mold.

FIG. 5 is a cross sectional view in elevation of a portion of the composite sheet of FIG. 4 showing the composite sheet during a vacuuming process.

DETAILED DESCRIPTION OF THE INVENTION

Figure 1:
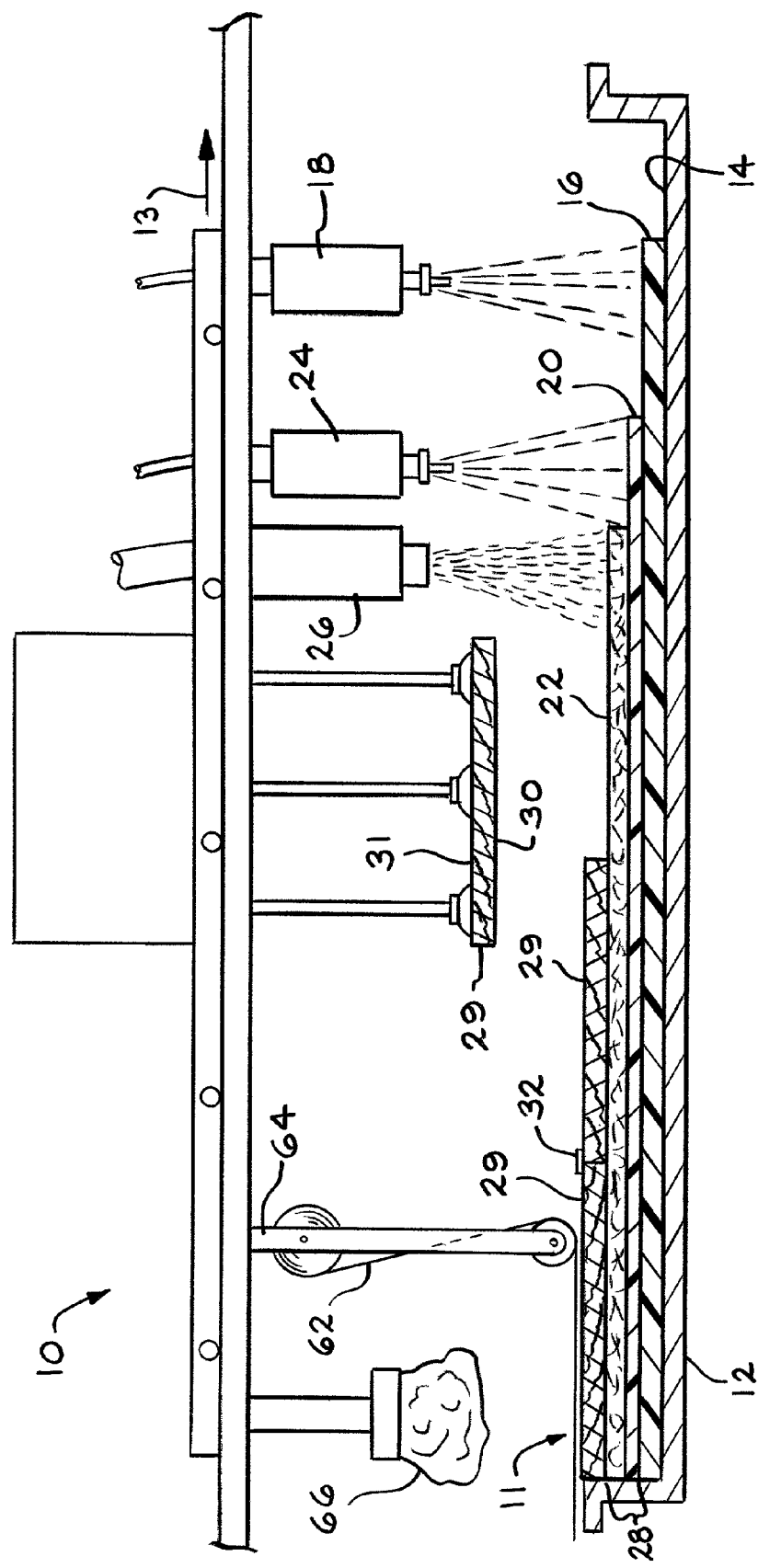
FIG. 1 is a schematic view in elevation, partially in cross section, of an apparatus for manufacturing a composite sheet according to the invention.

Referring now to the drawings, there is shown in FIG. 1 an apparatus 10 for manufacturing a composite sheet 11 according to the invention. The illustrated manufacturing process involves passing series of manufacturing operations over an elongate mold 12 in a direction, indicated by the arrow 13 in FIG. 1. The mold 12 is made of any suitable material, such as fiberglass. Typically the mold 12 is somewhat larger than the composite sheet to be made, and large enough to accommodate a 3×12 meter (10×40 ft.) composite sheet. An upwardly facing surface 14 of the mold 12 has a smooth face to provide a substantially flat and smooth surface to the composite sheet 11. The surface 14 forms the exterior surface of the composite sheet to be made.

In a first step of the manufacturing process, an outer coat of material is applied to the surface 14 of the mold 12. Typically, the outer coat is a gel coat 16, but may be any suitable material such as a veneer or a composite material. The gel coat 16 is a commercially available quick setting polymer applied to the surface of a mold. The gel coat 16 cures to form a high gloss exterior surface for the finished composite sheet 11. The gel coat 16 may include a pigment and provides a durable and esthetically pleasing outer surface for the finished composite sheet 11. Preferably, the gel coat 16 is applied in two layers by a sprayer 18. Typically, the sprayer 18 is moved longitudinally along rails and sprays the entire length of the elongate mold 12. Preferably, the sprayer 18 is a conventional sprayer, such as a sprayer commercially available from Magnum Venus of Kent, Wash. The spray head of the sprayer 18 preferably spans transversely across the mold 12 and discharges the gel coat 16 in a spray pattern and with a substantially uniform thickness. Preferably, the gel coat 16 is a polymer having a catalyst which sets up to a gel in about 20 minutes and cures, or hardens, in about 35 minutes. It will be understood that more than one sprayer 18 may be used to apply the gel coat 16, and that other methods for applying the gel coat 16 can be used.

In a second step of the manufacturing process, a composite mixture of resin 20 and reinforcement material, such as chopped fiberglass 22, is applied to the gel coat 16 to form a reinforcement layer 28. The resin 20 may comprise a polymer similar to the gel coat 16, but without a pigment. The resin 20 may be any suitable commercially available polyester resin, such as CoREZYN COR61-AA-830 DCPD laminating resin, from Interplastic Corporation, Minneapolis, Minn. Preferably, however, a polyester/epoxy blend resin having a low shrink characteristic, such as AME 2000 LB 6527-017, from the Ashland Specialty Chemical Company, Composite Polymers Division, Bartow, Fla., will be used. Preferably, the resin 20 is applied by a resin sprayer 24, and the fiberglass 22 is applied by a fiberglass applicator 26. The resin sprayer 24 and the fiberglass applicator 26 are preferably both conventional. The fiberglass applicator 26 is designed for chopping fiberglass fibers 22 and dispensing the chopped fibers 22 in various sizes to form a laminate or reinforcement layer 28 consisting of a mixture of the resin 20 and the fiberglass fibers 22. Such dispensing and spray apparatus may be obtained commercially, for example from Magnum Venus of Kent, Wash. Like the sprayer 18, the sprayer 24 and applicator 26 preferably move longitudinally along rails, span transversely across the mold 12, and discharge resin 20 and chopped fiberglass 22, respectively, in a pattern and with a substantially uniform thickness. It will be understood that more than one resin sprayer 24 and fiberglass applicator 26 may be used to apply the resin 22 and the fiberglass fibers 22. When applying the resin 20 and the chopped fiberglass 22, either the resin 20 or the fiberglass 22 can be applied first, or the resin 20 and the fiberglass 22 can be applied simultaneously. The reinforcement layer 28 may be rolled with weighted rollers (not shown) to remove air from the reinforcement layer 28.

In an alternative embodiment of the invention (not shown), the chopped fiberglass fibers are replaced by a glass mat or other suitable reinforcement material. The mat is applied to the resin in a manner similar to the chopped fiberglass fibers described above. In a further such alternative embodiment, such a glass mat is saturated with the polymer resin 20 and applied on top of the gel coat material 16, thereby eliminating the steps of applying the chopped fiberglass 22 and spraying the resin 20. Furthermore, the mat may comprise nonwoven mat, or a stitched or knitted mat so as to provide strength characteristics as desired. The reinforcement layer 28 is applied on top of such a nonwoven mat.

In a third step of the manufacturing process, a plurality of perforated reinforcement panels 29 are applied to the reinforcement layer 28 in a side-by-side manner. The perforated reinforcement panels 29 are preferably wood panels, typically referred to as luaun. Each panel 29 typically has a thickness of about 3.4 mm and includes a relatively smooth first surface 30 and a relatively rough second surface 31. The first surface 30 of the panel 29 is applied to the reinforcement layer 28. The panels 29 are abutted together along their respective edges. Normally, strips of webbing 32, such as strips of fiberglass mat, are wetted with a catalyzed resin and applied at each seam between the reinforcement panels 29 to reinforce the composite sheet 11. Typically, the reinforcement panels are 1.2×2.4 meter (4 ft.×8 ft.) panels. Thus the 2.4 m (8 ft.) length of the panel 29 corresponds to the width of the composite sheet 11. Although the composite sheet 11 is described as having a plurality of reinforcement panels 29, it will be understood that a continuous reinforcement backing may be provided, thereby eliminating the seams between each panel 29 and eliminating the webbing 32. Such a continuous reinforcement backing may comprise a composite sheet, polymer sheet, foam, coiled steel or aluminum, or other material having the desired properties for a particular application. Additionally, these materials may be used in the form of a plurality of discrete sheets as described with reference to the luaun panels 29. Furthermore, the panels 29 may comprise substantially thicker panels depending on the application, for example 19 mm (¾ inch) thick plywood sheet may be used in a truck body, and in such a case, the holes 50 are preferably drilled.

In an alternative embodiment, a fiberglass reinforced plastic (FRP) compound is adhered to a reinforcement board according to the present invention. Such an FRP sheet is commercially available from Kemlite as a Filon panel. Such a panel comprises a known pre-impregnated, glass-fiber-reinforced, unsaturated polyester resin molding compound in dry continuous sheet form sandwiched between two protective layers of polyethylene film. Such an FRP sheet is preferably hot pressed between matched dies against the reinforcement panel 29.

Figure 2:
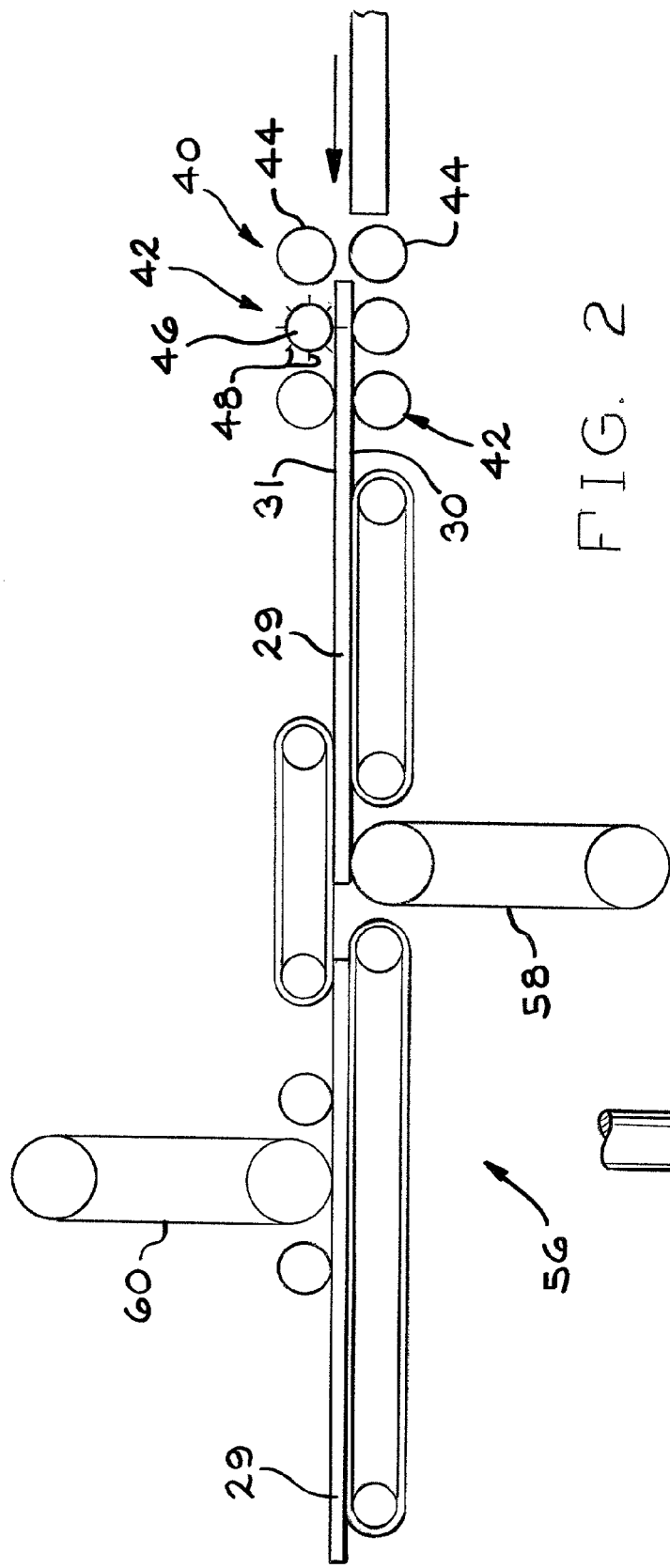
FIG. 2 is a schematic view in elevation of an apparatus for perforating panels according to the invention.

Referring now to FIG. 2, there is illustrated a mechanism for perforating the panels 29, the perforating mechanism being shown generally at 40. The perforating mechanism 40 preferably includes three sets 42 of rollers 44. Each set 42 of rollers includes two opposed pinch-rollers 44. Preferably, one roller of a middle set is a perforating mandrel 46, positioned to be applied against a surface of the reinforcement panel 29. The perforating mandrel 46 illustrated in FIG. 2 is shown as an upper roller in the middle set of rollers 42, however, it will be understood that the perforating mandrel 46 may be a lower roller of the middle set of rollers. Preferably, the reinforcement panel 29 is fed into the perforating mechanism 40, between the opposed pinch-rollers 44 of the sets 42, such that the perforating mandrel 46 is applied against the second surface 31 of the panel 29. Although the perforating mechanism 40 illustrated includes three sets of rollers 42, perforating mechanisms having any suitable number of sets of rollers 42, and any suitable number of perforating mandrels 46 may be used.

Figure 3:
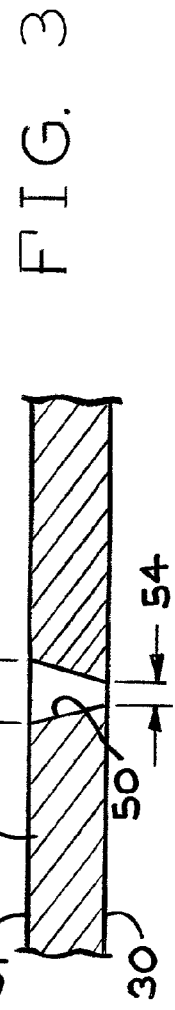
FIG. 3 is an enlarged schematic view, partially in cross section, of a perforating pin and the reinforcement panel of FIG. 2.

The perforating mandrel 46 is similar to the rollers 44, but includes a plurality of perforating pins 48. For reasons that will be explained below, each perforating pin 48 preferably has a tapered or conical shape so as to produce a tapered or conical hole 50. As shown in FIG. 3, each tapered hole 50 preferably includes an opening 54 in the first surface 30 having a diameter within the range of from about 0.8 mm (1/32 inch) to about 1.6 mm (1/16 inch). More preferably the opening 52 in the first surface 30 has a diameter of about 1.6 mm (1/16 inch). The hole 50 also preferably includes an opening 52 in the second surface 31 having a diameter within the range of from about 4.0 mm (5/32 inch) to about 4.8 mm (3/16 inch). More preferably the opening 52 in the second surface 31 has a diameter of about 4.8 mm (3/16 inch). It will be understood that the diameter of the hole 50 may be substantially uniform, such that the diameter of the opening in the first surface 30 is substantially equal to the diameter of the opening in the second surface 31. It is further appreciated that the hole 50 is preferably substantially round, but may comprise a variety of shapes, including for example without limitation an oval, rectangular, or star-shaped hole.

The perforating mandrel 46 is preferably arranged to create a plurality of tapered holes 50 in the reinforcement panel 29 such that the density of holes is within the range of from about 1 hole per square decimeter to about 9 holes per square decimeter (about 4 to about 49 holes per square foot) of reinforcement panel 29. More preferably, the density of holes is within the range of from about 2 holes per square decimeter to about 6 holes per decimeter (about 9 to about 36 holes per square foot) of reinforcement panel 29. Most preferably, the density of holes is within the range of from about 2 holes per square decimeter to about 4 holes per decimeter (about 9 to about 16 holes per square foot) of reinforcement panel 29, such as holes arranged in an evenly spaced 1 decimeter by 1 decimeter (4 inch by 4 inch) grid pattern. It will be understood that the holes 50 may be of any size and density sufficient to evacuate substantially all air trapped between the resin 20 and the reinforcement panel 29 (thereby avoiding regions of trapped air between the resin and reinforcement panel which may be prone to delamination).

The perforating mechanism 40 is preferably provided in conjunction with a sander assembly 56. The sander assembly 56 includes a sander 58 arranged to sand the first surface 30 of the panel 29, and may include a second sander 60 arranged to sand the second surface 31 of the panel 29. The first surface 30 contacts the resin 20 and is adhered thereto. The sanders 58 and 60 of the sander assembly 56 can be any conventional sander. Preferably, the perforating mechanism 40 is placed in line with the sanders 58 and 60 of the sander assembly 56. However, it will be understood that the perforating mechanism 40 may be a stand-alone mechanism. After the perforated reinforcement panels 29 have been sanded, they may be stacked or stored until needed. Although shown in FIG. 2 prior to sanding, the mechanism 40 may be provided after the sanders 58 and 60.

Alternatively, although not illustrated, the perforating mechanism could comprise a press having a plurality of pins or a plurality of drills arranged to form the pattern of perforations described above. Furthermore, where the reinforcement panel 29 comprises a composite or foam sheet, the perforation mechanism may comprise a series of pins positioned within the composite or foam material prior to solidification.

In a fourth step of the manufacturing process, a previous layer of polyester sheet or film 62 (FIGS. 1, 4, and 5) and a layer of nylon mesh (not shown) may be applied to the second surface 31 of the panels 29. The polyester sheet 62 may be applied by a mechanical applicator or feed station 64, or may be applied by hand. Similarly, the nylon mesh may be applied by a mechanical applicator or feed station (not shown) or may be applied by hand. The polyester sheet 62 may be any suitable polyester sheet or film, such as a MYLAR sheet or film (MYLAR is a registered trademark of E. I. Du Pont de Nemours). The polyester sheet 62 and the nylon mesh are applied to the second surface 31 of the panels 29 to facilitate an even evacuation of air during the application of a vacuum, as will be described below. The polyester sheet 62 also helps prevent a vacuum bag 66 from sticking to the reinforcement layer 28. Although the previous layer 62 is preferably polyester, any sheet of film that will facilitate an even evacuation of air during the application of a vacuum, and that helps prevent the vacuum bag 66 from sticking to the reinforcement layer 28 can be used.

In a fifth step of the manufacturing process, means for applying a vacuum, such as the vacuum bag 66, is placed around the mold 12, as illustrated in FIG. 4. The vacuum bag 66 may be secured to the mold 12 by any suitable means, such as an elastomeric band 67 or clamps (not shown). The vacuum bag 66 includes a plurality of vacuum lines 68. Each vacuum line 68 is connected to a vacuum pump 70. The vacuum pump 70 preferably creates a vacuum pressure within the range of from about 5.0 cm (2.0 in.) Hg to about 7.6 cm (3.0 in.) Hg. More preferably, the vacuum pump 70 creates a vacuum pressure of about 6.3 cm (2.5 in.) Hg. The vacuum pump pulls the air from between the bag 66 and the second surface 31 of the panel 29. The vacuum draws the layers of the composite sheet 11 together, and pulls out any air trapped between the panel 29 and the gel coat 16. During the vacuum process, the trapped air is pulled through the holes 50. In addition, material of the reinforcement layer 28 is forced or pulled into the holes 50, as shown in FIG. 5.

After the reinforcement layer 28 hardens, the vacuum bag 66 is removed from the mold 12. When the composite sheet 11 is fully cured, the sheet 11 is removed from the mold 12. The sheet 11 may be removed from the mold 12 by a lifting mechanism (not shown) and moved to a location for additional processing, such as trimming and inspection.

It is known that pockets of air may become trapped between the reinforcement panel 29 and the gel coat layer 16 of the composite sheet 11. More particularly, air may become trapped between the reinforcement panel 29 and the reinforcement layer 28. Such trapped air can cause a distorted appearance on the finished surface 16 of the composite sheet 11, and this results in composite sheets 11 that must be scrapped or remanufactured, adding cost and time to the manufacturing process. The distorted appearance may worsen over time due to the effects of heat related expansion and contraction of both the trapped air and the composite sheet 11.

Many attempts have been made to decrease the amount of air that becomes trapped in the composite sheet 11, such as by increasing the pressure of the vacuum applied to the composite sheet 11 during its manufacture. Typically, a vacuum pressure within the range of from about 25.4 cm (10 in.) Hg to about 30.5 cm (12 in.) Hg is applied to the composite sheet 11. Increasing the vacuum pressure to a level higher than 25.4 to 30.5 cm (10 to 12 in.) Hg has not resulted in a substantial reduction in the occurrence of trapped air pockets in the composite sheet 11.

During testing, composite sheets 11 made with perforated reinforcement panels 29 and composite sheets 11 made with conventional reinforcement panels 29 were exposed to identical varying temperature and environmental conditions. For example, the composite sheets 11 were exposed to a range of worst-case temperature extremes to which the sheets 11 might be subjected to when installed on a vehicle, such as a recreational vehicle.

Surprisingly, it has been shown that the composite sheets 11 manufactured with perforated reinforcement panels 29 had substantially no trapped air pockets, while substantially all the composite sheets 11 manufactured with conventional reinforcement panels had some pockets of trapped air.

It has also been shown that the polyester/epoxy blend resin 20, forming the reinforcement layer 28, flows into and fills the holes 50 during the manufacturing process. It is known that a conventional polyester resin will shrink as the polyester resin cures or hardens. It has also been shown that when such a conventional polyester resin is used with a perforated reinforcement panel 29 of the invention to manufacture a composite sheet 11, disadvantageous depressions or dimples may form in the gel coat 16 opposite each hole 50. Such dimples occur after the polyester resin cures, the resin shrinking toward the hole 50 and toward the second surface 31 of the reinforcement panel 29. Significantly, when the low shrink polyester/epoxy blend resin 20 was used to manufacture a composite sheet 11 having a perforated reinforcement panel 29, substantially no dimples were observed.

As described above, the holes 50 are preferably tapered. It has been shown that such a tapered hole further enhances the appearance of the finished surface of the composite sheet 11. The smaller diameter opening 54 of the tapered hole 50 provides the smallest possible opening diameter on the first surface 30 of the composite sheet 11 such that air may be completely removed, and such that the occurrence of dimples is minimized. It has also been shown that the tapered holes 50, the dimensions of which have been described in detail above, produce fewer burrs in the second surface 31 than similarly manufactured holes having a uniform diameter, thereby minimizing the amount of surface sanding required.

It has also been shown that using perforated reinforcement panels 28 having a plurality of holes arranged in an evenly spaced 1 decimeter by 1 decimeter (4 inch by 4 inch) grid pattern as described above, results in removal of substantially all trapped air. Additionally, it has been shown that the removal of substantially all trapped air occurs at a reduced vacuum pressure, such as a vacuum pressure within the range of from about 5.0 cm (2.0 in.) Hg to about 7.6 cm (3.0 in.) Hg.

It has further been shown that using a reinforcement panel 29 perforated with a plurality of tapered holes 50, results in a composite sheet 11 having a substantially stronger bond between the gel coat 16, reinforcement layer 28, and the reinforcement panel 29, relative to a composite sheet manufactured with a reinforcement panel having a plurality of uniform diameter holes. Using such a perforated reinforcement panel 29 also results in a composite sheet 11 having a substantially stronger bond between the gel coat 16, reinforcement layer 28, and the reinforcement panel 29, relative to a composite sheet manufactured with a reinforcement panel having no perforations.

Although the manufacturing operations, such as the sprayers 18 and 24, and the applicator 26 are illustrated as mounted on a rail positioned above the mold 12, it will be understood that the sprayers 18 and 24, and the applicator 26 may be separately mounted on one or more rails positioned above, below, or in the same plane as the mold 12.

The principle and mode of operation of this invention have been described in its preferred embodiments. However, it should be noted that this invention may be practiced otherwise than as specifically illustrated and described without departing from its scope. For example, the mold 12 may be movable relative to a plurality of stationary manufacturing operations, such as the gel coat sprayer 16, the resin sprayer 24, and the fiberglass applicator 26, as described in commonly assigned co-pending U.S. patent application Ser. No. 09/997,893, filed Nov. 30, 2001, or may be used in a continuous molding process as described in commonly assigned co-pending U.S. patent application Ser. No. 09/998,731, filed Nov. 30, 2001, both of which are incorporated herein by reference.

What is claimed is:

1. A method of manufacturing a composite sheet comprising the steps of:
    perforating a reinforcement panel;
    providing a mold surface onto which a composite sheet may be formed;
    applying at least one outer coat of material onto the mold surface;
    applying at least one coat of resin and reinforcement material over the outer coat to form a reinforcement layer;
    applying the perforated reinforcement panel to the reinforcement layer; and
    forcing the resin into the perforations formed in the reinforcement panel, thereby bonding the reinforcement layer to the reinforcement panel, wherein the perforating step is accomplished by moving the reinforcement panel through three sets of opposed pinch-rollers, one roller of a middle set of the three sets being a perforating mandrel having a plurality of tapered perforating pins.

2. The method of manufacturing a composite sheet according to claim 1 wherein the forcing step is accomplished by applying a vacuum to the perforated reinforcement panel.

3. The method of manufacturing a composite sheet according to claim 1 wherein a polymer sheet is applied to the perforated reinforcement panel prior to the forcing step.

4. A method of manufacturing a composite sheet comprising the steps of:
    perforating a reinforcement panel;
    providing a mold surface onto which a composite sheet may be formed;
    applying at least one outer coat of material onto the mold surface;
    applying at least one coat of resin and reinforcement material over the outer coat to form a reinforcement layer;
    applying the perforated reinforcement panel to the reinforcement layer; and
    forcing the resin into the perforations formed in the reinforcement panel, thereby bonding the reinforcement layer to the reinforcement panel,
    wherein the perforating step includes creating a plurality of tapered holes in the reinforcement panel, the tapered holes having an opening diameter within the range of from about $1/32$ inch to about $1/16$ inch in a first side of the reinforcement panel and having an opening diameter within the range of from about $5/32$ inch to about $3/16$ inch in a second side of the reinforcement panel, and
    wherein the perforating step is accomplished by moving the reinforcement panel through three sets of opposed pinch-rollers, one roller of a middle set of the three sets being a perforating mandrel having a plurality of perforating pins.

5. The method of manufacturing a composite sheet according to claim 4 wherein the forcing step is accomplished by applying a vacuum to the perforated reinforcement panel.

6. The method of manufacturing a composite sheet according to claim 4 wherein a polymer sheet is applied to the perforated reinforcement panel prior to the forcing step.

7. A method of manufacturing a composite sheet comprising the steps of:
    forming perforations in a reinforcement panel;
    providing a mold surface onto which a composite sheet may be formed;
    applying at least one coat of resin and reinforcement material over the mold to forte a reinforcement layer,
    applying the perforated reinforcement panel to the reinforcement layer; and
    evacuating substantially all air trapped between the resin and the resin and the reinforcement panel through the perforations, wherein the perforating step is accomplished by moving the reinforcement panel Through three sets of opposed pinch-rollers, one roller of a middle set of the three sets being a perforating mandrel having a plurality of perforating pins.

8. The method of manufacturing a composite sheet according to claim 7 wherein the forcing step is accomplished by applying a vacuum to the perforated reinforcement panel.

9. The method of manufacturing a composite sheet according to claim 7 wherein a polymer sheet is applied to the perforated reinforcement panel prior to the forcing step.

* * * * *